(12) United States Patent
Soldavini et al.

(10) Patent No.: US 9,665,876 B2
(45) Date of Patent: *May 30, 2017

(54) SYSTEM OF PUBLICATION AND DISTRIBUTION OF INSTRUCTIONAL MATERIALS AND METHOD THEREFOR

(71) Applicant: Monvini Limited, Sparks, NV (US)

(72) Inventors: Michael Anthony Soldavini, Sparks, NV (US); Manus Bernard Monroe, Sebastopol, CA (US)

(73) Assignee: Monvini Limited, Sparks, NV (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/170,380

(22) Filed: Jan. 31, 2014

(65) Prior Publication Data

US 2014/0147826 A1 May 29, 2014

Related U.S. Application Data

(63) Continuation-in-part of application No. 10/965,600, filed on Oct. 13, 2004, now Pat. No. 8,641,424.

(Continued)

(51) Int. Cl.
*H04L 9/00* (2006.01)
*G06F 17/30* (2006.01)
(Continued)

(52) U.S. Cl.
CPC ..... *G06Q 30/0207* (2013.01); *G06Q 30/0217* (2013.01); *G06Q 30/0253* (2013.01);
(Continued)

(58) Field of Classification Search
CPC .. G06F 3/1204; G06F 17/24; G06F 17/30525; G06F 17/30707; G06F 17/30861; G06F 17/30864; G06F 17/30867; G06F 21/10; G06F 2221/2107; G06F 2221/2135; G06Q 10/00; G06Q 10/02; G06Q 10/10; G06Q 20/102; G06Q 20/123; G06Q 20/1235; G06Q 30/06; G06Q 30/0601; G06Q 30/02; G06Q 30/0264; G06Q 30/0269; G06Q 30/0271; G06Q 30/0272; G06Q 30/0273; G06Q 30/04; G06Q 50/184; G06Q 50/205; G09B 5/00; G09B 5/065;
(Continued)

(56) References Cited

U.S. PATENT DOCUMENTS 4,804,328 A * 2/1989 Barrabee .................. G09B 7/04
434/308
5,267,865 A * 12/1993 Lee ......................... G09B 5/065
273/430

(Continued)

*Primary Examiner* — Nikolai A Gishnock
(74) *Attorney, Agent, or Firm* — Brian Beverly; Beeson Skinner Beverly, LLP

(57) ABSTRACT

A system for publication and distribution of instructional materials comprises a host computer capable of receiving and storing educational works having one or more segments over a communications network, receiving one or more selections of at least one of the segments, producing a compilation of educational course materials containing at least the selected segments, receiving a request for access rights to a selection of one or more segments of the compilation, and providing access rights to the selected segments in response to the request.

18 Claims, 9 Drawing Sheets

Related U.S. Application Data

(60) Provisional application No. 60/513,907, filed on Oct. 23, 2003.

(51) Int. Cl.
*G06Q 10/06* (2012.01)
*G06Q 30/02* (2012.01)
*G09B 5/02* (2006.01)
*G09B 5/06* (2006.01)
*G09B 5/14* (2006.01)
*G09B 7/00* (2006.01)
*G09B 5/12* (2006.01)
*G09B 17/00* (2006.01)
*G09B 7/08* (2006.01)
*G09B 7/04* (2006.01)
*G09B 7/02* (2006.01)
*G09B 19/06* (2006.01)
*H04L 29/06* (2006.01)
*G09B 5/00* (2006.01)

(52) U.S. Cl.
CPC ............... *G09B 5/00* (2013.01); *G09B 5/02* (2013.01); *G09B 5/065* (2013.01); *G09B 5/12* (2013.01); *G09B 5/14* (2013.01); *G09B 7/00* (2013.01); *G09B 7/02* (2013.01); *G09B 7/04* (2013.01); *G09B 7/08* (2013.01); *G09B 17/00* (2013.01); *G09B 19/06* (2013.01); *H04L 63/08* (2013.01); *H04L 67/42* (2013.01); *Y10S 706/927* (2013.01); *Y10S 707/99939* (2013.01); *Y10S 707/99943* (2013.01)

(58) Field of Classification Search
CPC ... G09B 5/02; G09B 5/12; G09B 5/14; G09B 7/00; G09B 7/02; G09B 7/04; G09B 7/08; G09B 17/00; G09B 19/06; H04L 63/08; H04L 67/42; Y10S 706/927; Y10S 707/99939; Y10S 707/99943
USPC .................... 434/322, 323; 726/26–28
See application file for complete search history.

(56) References Cited

U.S. PATENT DOCUMENTS

| | | | | |
|---|---|---|---|---|
| 5,819,300 A * | 10/1998 | Kohno | .................... | G06F 17/22 715/246 |
| 5,917,912 A * | 6/1999 | Ginter | .................... | G06F 21/10 348/E5.006 |
| 6,141,528 A * | 10/2000 | Remschel | ............... | G09B 7/02 434/156 |
| 6,149,441 A * | 11/2000 | Pellegrino | ............... | G09B 7/02 434/118 |
| 6,381,444 B1 * | 4/2002 | Aggarwal | ............... | G09B 5/02 434/236 |
| 6,589,055 B2 * | 7/2003 | Osborne | ................ | G09B 5/12 434/219 |
| 6,654,748 B1 * | 11/2003 | Rabung | ................... | H04L 67/42 707/758 |
| 6,681,098 B2 * | 1/2004 | Pfenninger | ............. | G09B 5/00 434/336 |
| 6,694,331 B2 * | 2/2004 | Lee | ................... | G06F 17/30011 707/706 |
| 6,754,642 B2 * | 6/2004 | Tadayon | ............. | G06Q 20/123 705/1.1 |
| 6,845,229 B2 * | 1/2005 | Notomi | ................... | G09B 5/00 434/323 |
| 6,898,601 B2 * | 5/2005 | Amado | .................. | G06F 17/24 707/999.01 |
| 6,920,495 B1 * | 7/2005 | Fuselier | ............. | G06F 17/30861 707/E17.107 |
| 7,085,741 B2 * | 8/2006 | Lao | ........................ | G06F 21/10 380/201 |
| 7,210,938 B2 * | 5/2007 | Packard | .................. | G09B 7/00 434/365 |
| 7,275,061 B1 * | 9/2007 | Kon | .................. | G06F 17/30707 707/999.101 |
| 7,856,414 B2 * | 12/2010 | Zee | ....................... | G06Q 10/02 |
| 8,185,614 B2 * | 5/2012 | Leggette | ........... | G06F 17/30194 709/220 |
| 8,364,711 B2 * | 1/2013 | Wilkins | ................. | G06Q 10/10 707/783 |
| 8,453,175 B2 * | 5/2013 | Reid | ...................... | G06Q 30/02 725/41 |
| 8,812,874 B1 * | 8/2014 | Clifford | .............. | G06F 21/6209 713/193 |
| 8,848,969 B2 * | 9/2014 | Ramsdell | ............ | H04N 1/32144 382/100 |
| 8,935,796 B2 * | 1/2015 | Sloo | ........................ | G06F 21/10 726/26 |
| 2001/0043364 A1 * | 11/2001 | Messner | ........... | G06F 17/30867 358/1.15 |
| 2002/0087560 A1 * | 7/2002 | Bardwell | ................. | G09B 7/00 707/999.1 |
| 2003/0050935 A1 * | 3/2003 | Spetsmann | ........ | G06F 17/30525 707/999.107 |
| 2003/0073064 A1 * | 4/2003 | Riggs | ....................... | G09B 5/00 434/350 |
| 2003/0120557 A1 * | 6/2003 | Evans | ..................... | G06F 21/10 705/51 |
| 2003/0135458 A1 * | 7/2003 | Tadano | .................. | G06Q 10/02 705/40 |
| 2003/0152901 A1 * | 8/2003 | Altenhofen | ............. | G09B 7/00 434/350 |
| 2003/0152904 A1 * | 8/2003 | Doty, Jr. | .................. | G09B 7/00 434/350 |
| 2003/0191816 A1 * | 10/2003 | Landress | ................ | G06Q 30/02 709/219 |
| 2003/0208353 A1 * | 11/2003 | Ueda | ...................... | G09B 19/06 704/4 |
| 2004/0002039 A1 * | 1/2004 | Draper | ................. | G06Q 10/063 434/118 |
| 2004/0030781 A1 * | 2/2004 | Etesse | ................... | G06Q 30/06 709/225 |
| 2004/0033475 A1 * | 2/2004 | Mizuma | ................. | G06Q 10/06 434/219 |
| 2004/0205653 A1 * | 10/2004 | Hadfield | ................ | G06Q 10/10 715/255 |
| 2005/0125358 A1 * | 6/2005 | Levin | ..................... | G06F 21/10 705/59 |
| 2005/0138033 A1 * | 6/2005 | Katta | ................ | G06F 17/30864 |
| 2005/0227216 A1 * | 10/2005 | Gupta | ................. | G06Q 50/205 434/322 |
| 2005/0251454 A1 * | 11/2005 | Wood | ................... | G06Q 20/123 705/26.81 |
| 2006/0021068 A1 * | 1/2006 | Xu | ........................... | G06F 21/10 726/30 |
| 2007/0078775 A1 * | 4/2007 | Huapaya | ................ | G06F 21/10 705/59 |
| 2007/0143856 A1 * | 6/2007 | Aerrabotu | ......... | G06F 17/30038 726/26 |
| 2007/0174362 A1 * | 7/2007 | Pham | ............ | G06F 21/6209 |
| 2007/0250901 A1 * | 10/2007 | McIntire | ............ | H04N 7/17318 725/146 |
| 2007/0277247 A1 * | 11/2007 | Levy | ....................... | G06F 21/10 726/28 |
| 2008/0057904 A1 * | 3/2008 | Pousti | .................... | G06Q 30/06 455/406 |
| 2008/0141381 A1 * | 6/2008 | Walkoe | ................. | G06F 21/10 726/28 |
| 2008/0178284 A1 * | 7/2008 | Harwell | ................. | G06F 21/10 726/21 |
| 2008/0247543 A1 * | 10/2008 | Mick | ...................... | G06F 21/10 380/201 |
| 2008/0270311 A1 * | 10/2008 | Peterka | ................. | G06F 21/10 705/59 |

(56) References Cited

U.S. PATENT DOCUMENTS

| | | | |
|---|---|---|---|
| 2008/0301318 A1* | 12/2008 | McCue | G10L 25/78 709/231 |
| 2008/0301437 A1* | 12/2008 | Chevallier | H04N 7/165 713/155 |
| 2009/0083807 A1* | 3/2009 | Stephan | G06Q 30/06 725/87 |
| 2009/0196465 A1* | 8/2009 | Menon | G06F 21/10 382/118 |
| 2010/0049972 A1* | 2/2010 | Choi | G06F 21/60 713/159 |
| 2010/0070845 A1* | 3/2010 | Facemire | G06F 17/241 715/230 |
| 2010/0119203 A1* | 5/2010 | Lewis | G06Q 30/0284 386/278 |
| 2011/0131326 A1* | 6/2011 | Medard | H04L 67/1097 709/225 |
| 2011/0231293 A1* | 9/2011 | David | G06F 17/30244 705/27.2 |
| 2012/0144195 A1* | 6/2012 | Nair | H04L 63/0428 713/168 |
| 2013/0051772 A1* | 2/2013 | Ramaswamy | H04N 21/25875 386/291 |
| 2013/0080415 A1* | 3/2013 | Maskatia | G06Q 30/02 707/709 |
| 2013/0089848 A1* | 4/2013 | Exeter | G09B 7/00 434/350 |
| 2014/0250534 A1* | 9/2014 | Flores | G06F 21/602 726/26 |
| 2014/0259180 A1* | 9/2014 | Shen | G06F 21/10 726/27 |
| 2015/0006752 A1* | 1/2015 | O'Hare | H04L 65/4069 709/231 |
| 2015/0046256 A1* | 2/2015 | Beyda | G06Q 30/02 705/14.49 |
| 2015/0249710 A1* | 9/2015 | Stefansson | G06F 21/10 709/217 |
| 2015/0332178 A1* | 11/2015 | Sorotokin | G06F 21/10 705/59 |
| 2016/0071074 A1* | 3/2016 | Baird | G06Q 20/102 705/40 |
| 2016/0203112 A1* | 7/2016 | Asamani | H04W 4/12 715/205 |
| 2016/0359817 A1* | 12/2016 | Mullen | H04L 63/0428 |

* cited by examiner

SYSTEM OF PUBLICATION AND DISTRIBUTION OF INSTRUCTIONAL MATERIALS AND METHOD THEREFOR

CROSS-REFERENCE TO RELATED APPLICATIONS

This application is a continuation-in-part of application Ser. No. 10/965,600, filed Oct. 13, 2004, which claims the benefit of U.S. Provisional Application No. 60/513,907, filed Oct. 23, 2003.

BACKGROUND OF THE INVENTION

The present invention relates to systems for publishing and distributing custom compilations of available books, articles and related published and unpublished matter that are prepared or specified for instructional courses.

Historically, instructional materials have been marketed and sold by directly approaching instructors employed at educational institutions via a publisher's sales representative and advertising campaigns through the mail and, most recently, through order placement from online catalogs provided by the websites of major publishing houses. Shipping costs and returns are born by the publisher, as well as sampling of books as promotional materials. Small circulation textbooks are expensive, due to both the high fixed and variable costs of traditional publishing. The textbooks must then be ordered by local bookstores or educational institutions in quantities sufficient to serve the anticipated class enrollment.

Prior modes of selecting and distributing instructional materials include the traditional route of an instructor selecting a textbook that best coincides with the curriculum that is expected to be taught. Instructors tend to be very selective when choosing which portions of available books and supporting materials are to be used for their classes. Students therefore are customarily saddled with purchasing a very expensive set of educator materials that will be only partially used for required course work. Moreover, instructors are usually limited in their choice of educational materials in rapidly evolving fields since the availability and quality of available textbooks become outmoded and include errors that will not be corrected until another edition goes to print.

The costs of such an inefficient system are not only reflected in the price of books, which is ultimately borne by students, but in the difficulty of meeting the needs of instructors seeking educational materials for course instruction, and in supplying students with current content in a timely manner.

SUMMARY OF INVENTION

The invention is unique in that it breaks from traditional systems for marketing and selling of bound, copyrighted textbooks and supplementary learning materials to students attending, or faculty employed by, learning institutions.

Applicants' system for publishing and distributing instructional materials via the Internet offers an alternative to the traditional practice of selling entire textbooks and accompanying ancillary educational materials as a unit. It provides for marketing and sales of these educational media to be conducted entirely over the Internet, or alternatively, over virtual and private networks of institutions, through a method of segmentation of the textbooks and ancillary materials. Thus, rather than purchasing a single book of multiple topics or lessons in a particular discipline, individual segments of the book or other material, such as a single lesson, could be purchased on an "as needed" basis. Instructors can mix and match lessons, each related to a common topic, authored by many authors and publishers in order to tailor their class assignments and presentations as desired. The system contemplates listing the segments on a host computer which supports a website that serves as an electronic storefront for potential purchasers, e.g., students. Thus, the electronic storefront also acts as the publisher of original educational materials submitted to the website by authors. The system accommodates subject matter in any discipline and works efficiently with the contents, composition and format of these individual segments by disseminating, transferring, distributing, transmitting or receiving sections, chapters, segments or any other component of any educational, instructional or informational materials over a computer network, such as the Internet or private networks by streaming content, or through the conventional distribution of computer readable media in a tangible format, such as a CD or DVD.

Thus, a first aspect of the invention provides a system for and method of compiling instructional materials wherein a publisher provides a catalog of available electronic content. Educators select two or more items of the available electronic content to generate a custom compilation such as a set of educational course materials for a class. The educator/instructor then associates institution and course identifiers with the compilation, providing a unique identity to the custom compilation. The electronic storefront then stores the custom compilation and makes it available for sale.

A second aspect of the invention is characterized by a system for and method of distributing custom compilations of course materials in which the electronic storefront or publisher posts available custom compilations on an electronic database searchable over a computer network. Students search the electronic database by institution and course identification number, then select and order one or more custom compilations. The student receives the selected course materials in a digital format or other form of computer readable medium.

A third aspect of the invention is characterized by a system for and method of grading a roster of students in which the institution or instructor of record provides a roster of students in a class. The roster is used to identify students who have qualified to receive an examination in the class by purchasing one or more custom compilations. Qualified students on the roster are then associated with an electronic examination. Thus, the qualified students are provided with the examination in electronic format, generally one in which completion of the examination, exercise or assignment includes answering one or more questions that require selection of the correct answer from a limited number of potential answers. Next, the examination is submitted to the host computer. The answers provided by the qualified students are then scored by automated data processing using an answer key to correlate the cumulative number of correct or partially correct answers by the qualified student with the examination questions to calculate a grade. Finally, the grade resulting from the examination is entered into the roster for the student.

A fourth aspect of the invention is characterized by providing data structures that enable the creating and formatting of a custom compilation described herein, the data structures having data fields for at least each of the instructors generating the compilation, the educational institution, the course, and for one or more identifiers of electronic content.

A fifth aspect of the invention is characterized by providing a data structure for a gradable roster, having data fields for at least the educational institution, course, student identifying information, qualification of the student by purchase of a custom compilation, and for one or more grades associated with students.

The above and other features, effects, and advantages of the present invention will become more apparent from the following description of the embodiments thereof taken in conjunction with the accompanying drawings.

DETAILED DESCRIPTION OF THE ILLUSTRATED EMBODIMENT

Figure 1A:
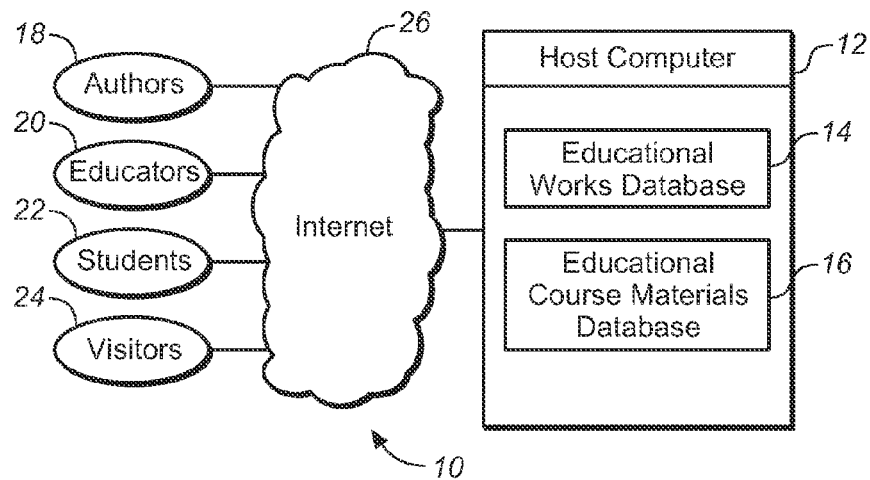
FIG. 1A is a schematic diagram of a system for publication and distribution of educational materials according to the invention.

Referring to the illustrations, wherein like reference numerals refer to like components in the various views, a new and improved system for and method of publication and distribution of instructional materials is described below.

TERM DEFINITIONS

A Custom Compilation is a derivative work of authorship that creates a set of educational course materials intended to supplement classroom education or self directed study by selecting from an offering of various types of electronic content originating from one or more publishers or authors.

Electronic content is defined as textual, visual, or audio content, and may include questions and potential answers, interactive media in fixed, tangible or temporal form of computer readable media, descriptions of experiments to be completed, and mathematical manipulation and graphing of experimental results.

A Roster is defined as a list of students registered for a particular class with a particular educational institution.

The Content Source Maintaining Party is an electronic storefront that manages the databases that house the electronic media made available for creating custom compilations, and access to the databases. The content source maintaining party or another third party (that is other than a student, author or instructor) provides an electronic storefront where students can procure the custom compilation over a communications network such as the Internet.

An Educational Institution is intended to encompass, without limitation, traditional schools, colleges, and universities whose primary mission is education, generally having one or more fixed locations, and includes operators or entities involved in corporate training programs, government and military training, certification programs, and online training or education.

Discussion

Referring initially to FIG. 1A, a system for publication and distribution of educational materials is indicated generally at 10. The system comprises a host computer 12 having an educational works database 14 and an educational course materials database 16. The host computer is in communication with authors 18, educators 20, students 22, and visitors 24 through a communications network such as the Internet 26.

Figure 1B:
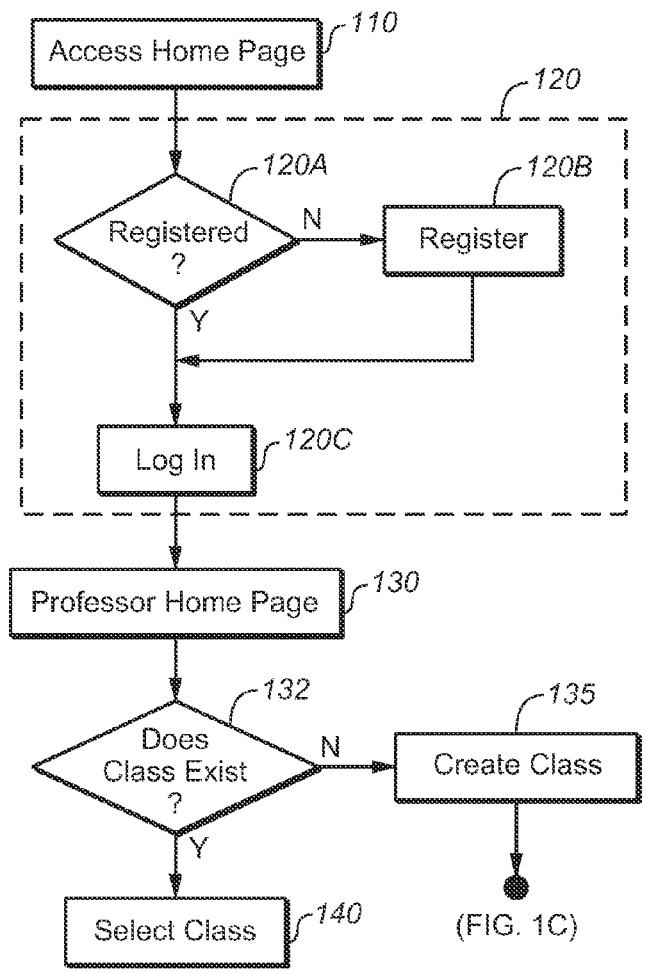
FIGS. 1B and 1C show a flow chart illustrating the interactive steps taken by an instructor to log in to the system depicted in FIG. 1A to create or select a class.

With reference now to FIG. 1B, the instructor initiates the process of creating a custom compilation by accessing the home page 110. The instructor then registers or logs in to the system at steps 120. The system first presents a query 120A asking if the instructor is already registered. If not already registered, the instructor registers at 120B. Once registered, the instructor logs in at 120C using an identification number and a key or code either associated with the institution or provided by the electronic storefront/server operator. The instructor is then directed to a professor home page 130. The instructor next searches for a class of interest on the system at 132. If the desired class does not exist, the instructor may create a class at 135. If the class already exists, the instructor may select it by entering a unique course number at 140. The unique course number preferably includes an institution identifier.

Figure 1C:
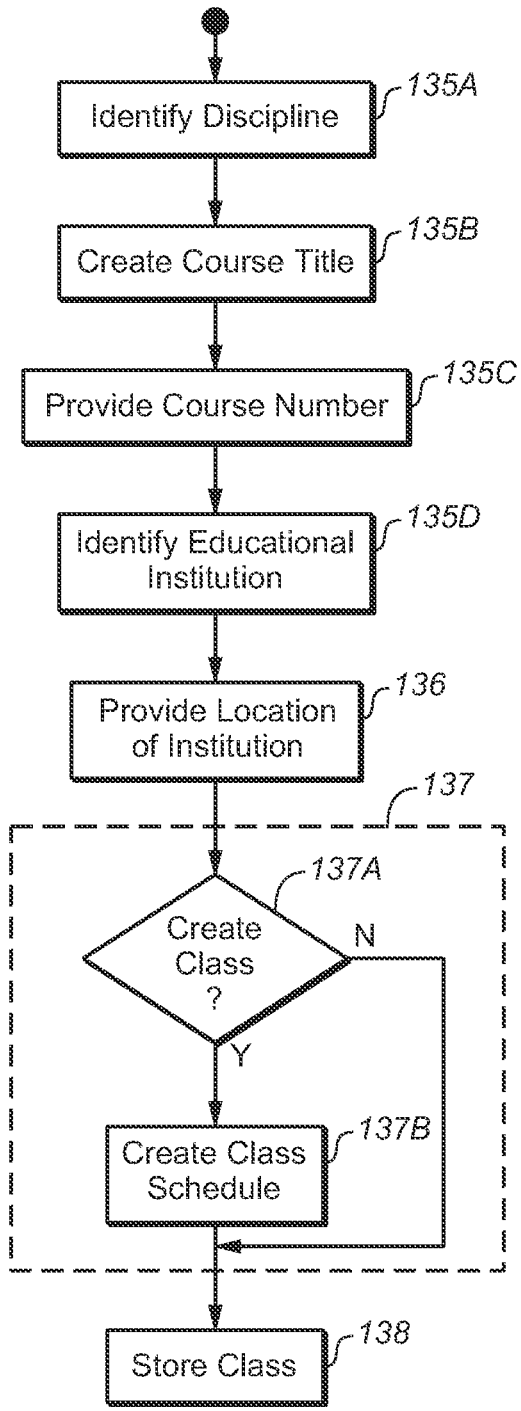

With additional reference now to FIG. 1C, creating the class involves defining, first, the discipline 135A, title 135B or course number 135C and, second, the school or institution, or both at 135D. Optionally at 136 the country, state or city in which the school or institution is located is provided to avoid confusion with other entities of the same or similar names. Creating the class electively involves creating a schedule for class work, teaching assistant led sessions, and other ancillary activities associated with the instructional program, as shown in step 137. If, at 137A, it is desired to create a class schedule, set teaching assistant sessions or provide information regarding other ancillary activities, such information is supplied at 137B. For example, the custom compilation may be augmented by insertion of selected materials that supplement the lecture schedule, materials specific to the instructor's classroom such as lecture notes, video clips of experiments, past lectures, or pre-recorded lectures for use if the instructor becomes unavailable. If it is not necessary or desired to do so, and once all the information for creation of the class has been supplied, the instructor stores the newly created class at 138.

Figure 1D:
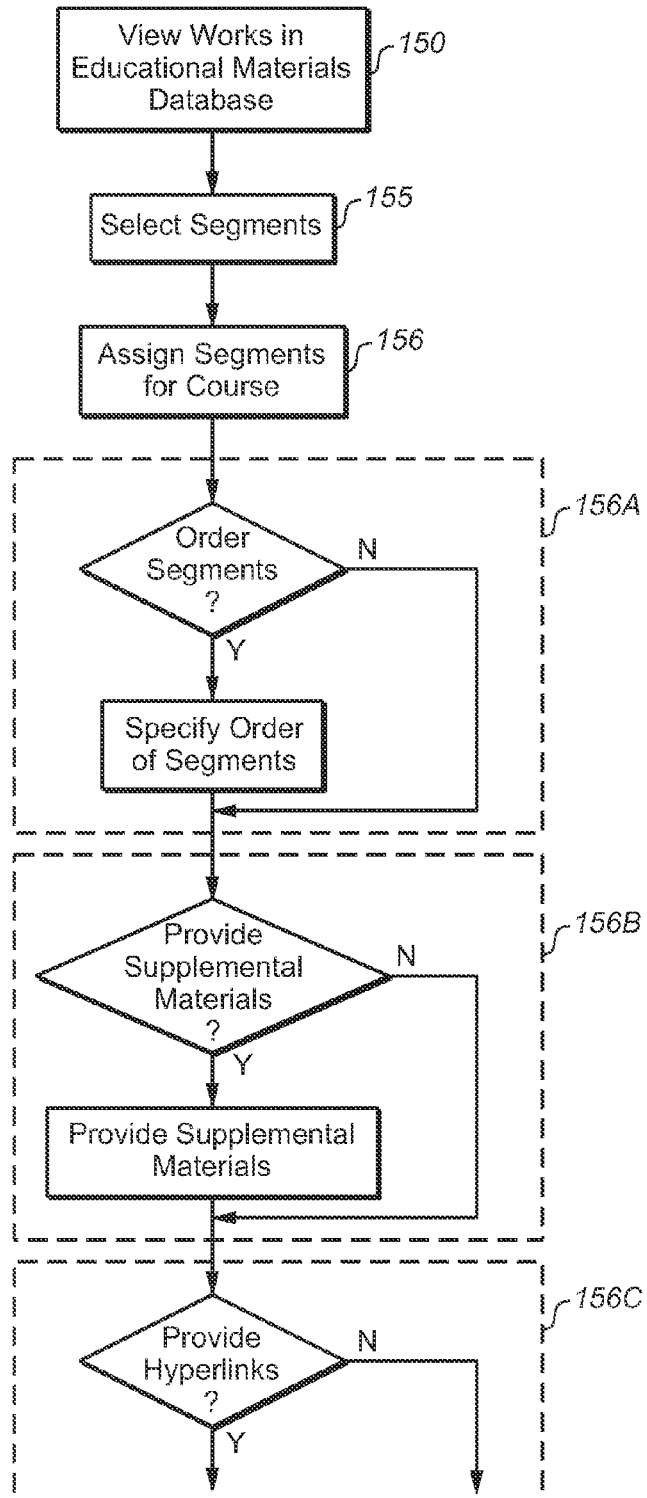
FIGS. 1D and 1E show a flow chart illustrating the interactive steps taken by an instructor when creating a custom compilation of educational course materials for a class.
Figure 1E:
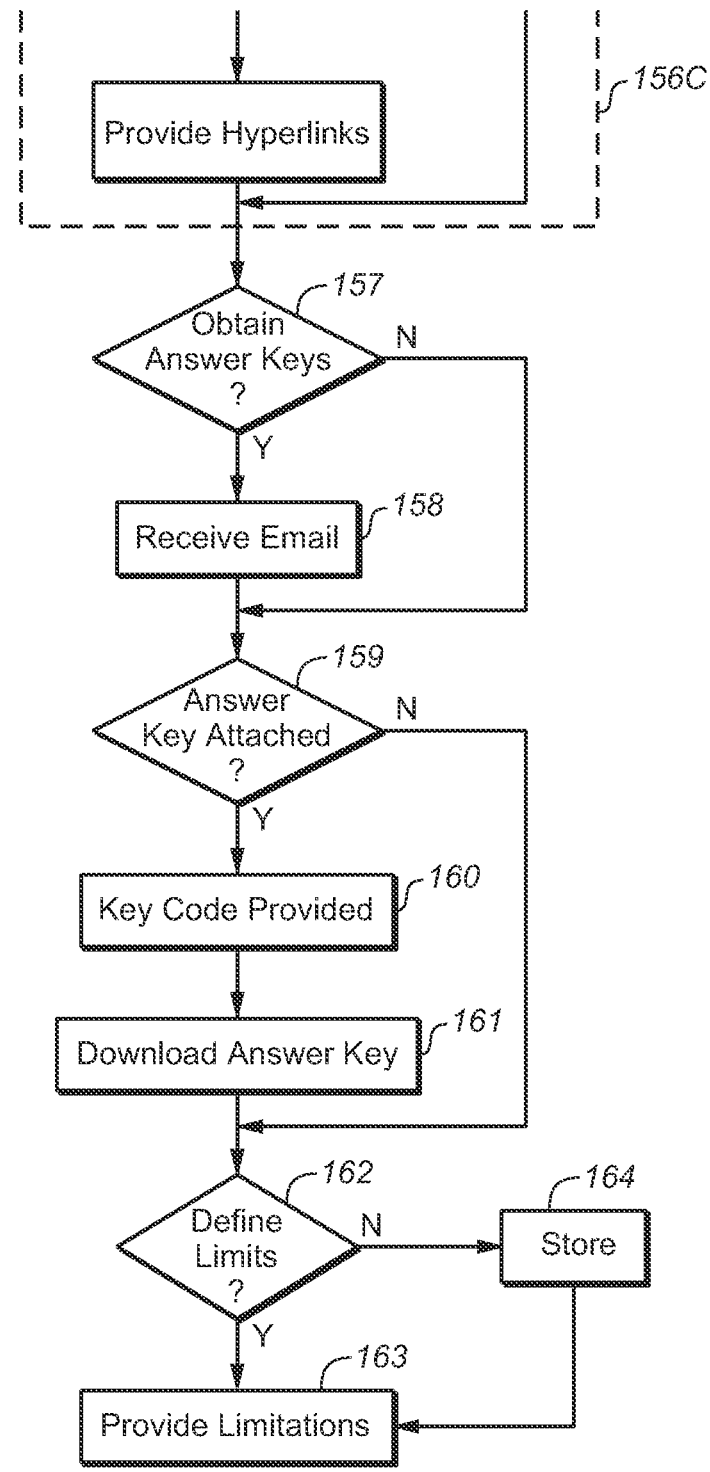
Figure 1F:
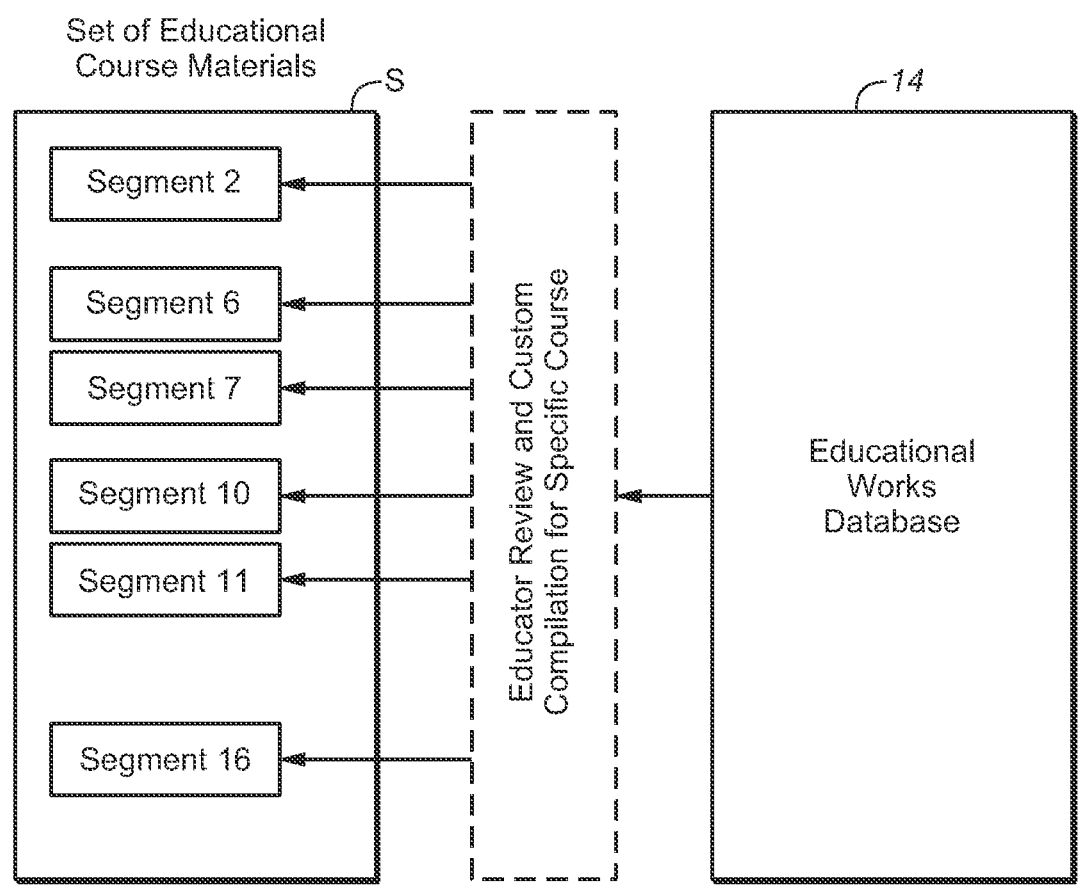
FIG. 1F is a schematic diagram of the selection of segments of interest from the educational works database to create a set of educational course materials for a class.

Referring to FIGS. 1D and 1E, in step 150 the instructor is directed to view the full text and illustrations of available educational works related to the course discipline stored in an educational materials database on the host computer. Course materials are generally organized and presented by the discipline or subject matter corresponding with the course created in step 135. Within each work of interest the instructor can then view potential segments of interest, such as book chapters, in step 155. After reviewing sufficient materials, the instructor creates the custom compilation, at least in part by assigning selected segments of interest from the educational materials database, in step 156. This process is graphically illustrated in FIG. 1F wherein it is shown that, based on review of the works in the educational works database 14 by an educator, segments are selected to create a set of educational course materials S for use with a specific course.

The process of assigning chapters may also include specifying the order of the chapters and sub-chapters at 156A, as well as providing supplemental and hyper-linked annotations at 1568 and 156C, respectively, such as web links to additional resources, lecture notes and outlines, e.g., PowerPoint presentations, video clips of experiments, suggested revisions submitted to the originating publisher or author that are not yet incorporated into the textual materials, safety instructions, legal releases, and instructions for laboratory assignments and teaching assistants.

In step 157, to the extent that a book or text has associated with it an answer key for a homework assignment, lab experiments, or examinations, the instructor requests the answer key. Preferably the host computer generates an email, at 158, which includes either an attachment containing the answer key or a key code, and sends it to the address of the instructor, or to an authorized designate at an educational institution. This prevents answer keys from being improperly obtained by students or others not having a legitimate need for access to them. If at 159 the email includes a key code, the instructor enters the key code at 160, and downloads the answer key and any or all chapters or segments of the custom compilation as may be needed, in step 161. Alternatively, the instructor may order for postal or courier delivery a CD or other form of computer readable media containing the same material or any portion thereof.

Access rights to all or portions of the custom compilation may encompass all the rights enjoyed by a purchaser of the materials. Alternatively, at 162 the availability of the custom compilation may be restricted by defining access rights that are more limited than the rights of a purchaser. For example, at 163 the availability to students or visitors of the custom compilation may be limited temporally, such that all or portions of the custom compilation are available only at selected times and dates. Thus, in one embodiment of the invention, students may have access to test questions only while a test is being administered. Alternatively, access to lecture notes may be available during a lecture but restricted after the lecture has been given in order to encourage classroom attendance and discourage students from skimming or reading ahead of the instructor. In another embodiment, if a lecturer or instructor is unavailable when a given class is scheduled, audio-visual content can be provided remotely as a substitute for the live lecture, or a pre-recorded lecture may be made available but only for viewing at the time of the regularly scheduled class. In yet another embodiment, the right to copy or print all or certain segments of the compilation may be restricted. In still another embodiment, access by visitors to all or portions of a custom compilation may be limited. If it is not desired to define limited access rights to the custom compilation, it can be stored as is, at 164.

According to the invention, a portion of the custom compilation, of which the instructor is the original author, may be submitted to the content source maintaining party to obtain a royalty according to the access rights sold for each copy of that portion.

Each custom compilation in effect creates a data structure having data fields for identifying the instructor generating the compilation, the educational institution, and the course, and for one or more identifiers of electronic content, the identifiers preferably including terms or codes that serve as proxies. Thus, collectively, the custom compilations of educational course materials form an educational course materials database.

In another embodiment, a roster is created or transmitted to the content source maintaining party that tracks students who are associated with each instructor's course. The roster is a data structure having data fields for recording and associating the educational institution, course identification information, student identification (such as name and/or student number), with a student who has acquired access to one or more segments of a custom compilation associated with a class thereby becoming qualified to be graded. The roster is available at the instructor's discretion for tracking such matters as the attendance of each student, the completion of and grades for laboratory, homework assignments and examinations, tallying of a final course grade therefrom, and any additional considerations elected by the instructor. The instructor is thus encouraged to rely on the roster for the automated grading features and other time saving benefits that accrue from its use. When the instructor makes use of and relies on the roster, students must obtain access to the custom compilation from the content source maintaining party to be qualified to be placed on the roster, and thus be entitled to be graded and receive credit for the course.

Figure 2A:
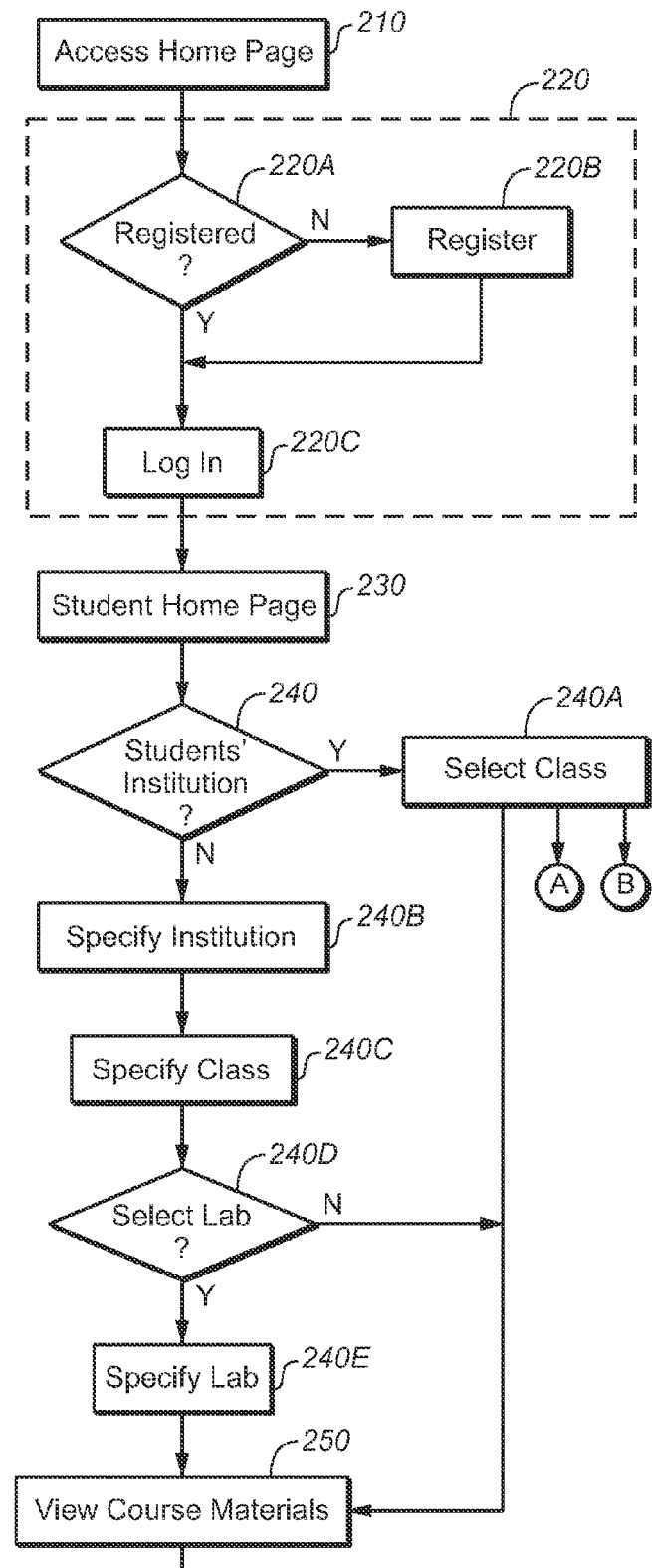
FIGS. 2A and 2B show a flow chart illustrating the interactive steps taken by a student when procuring a custom compilation of educational course materials for a selected class.
Figure 2B:
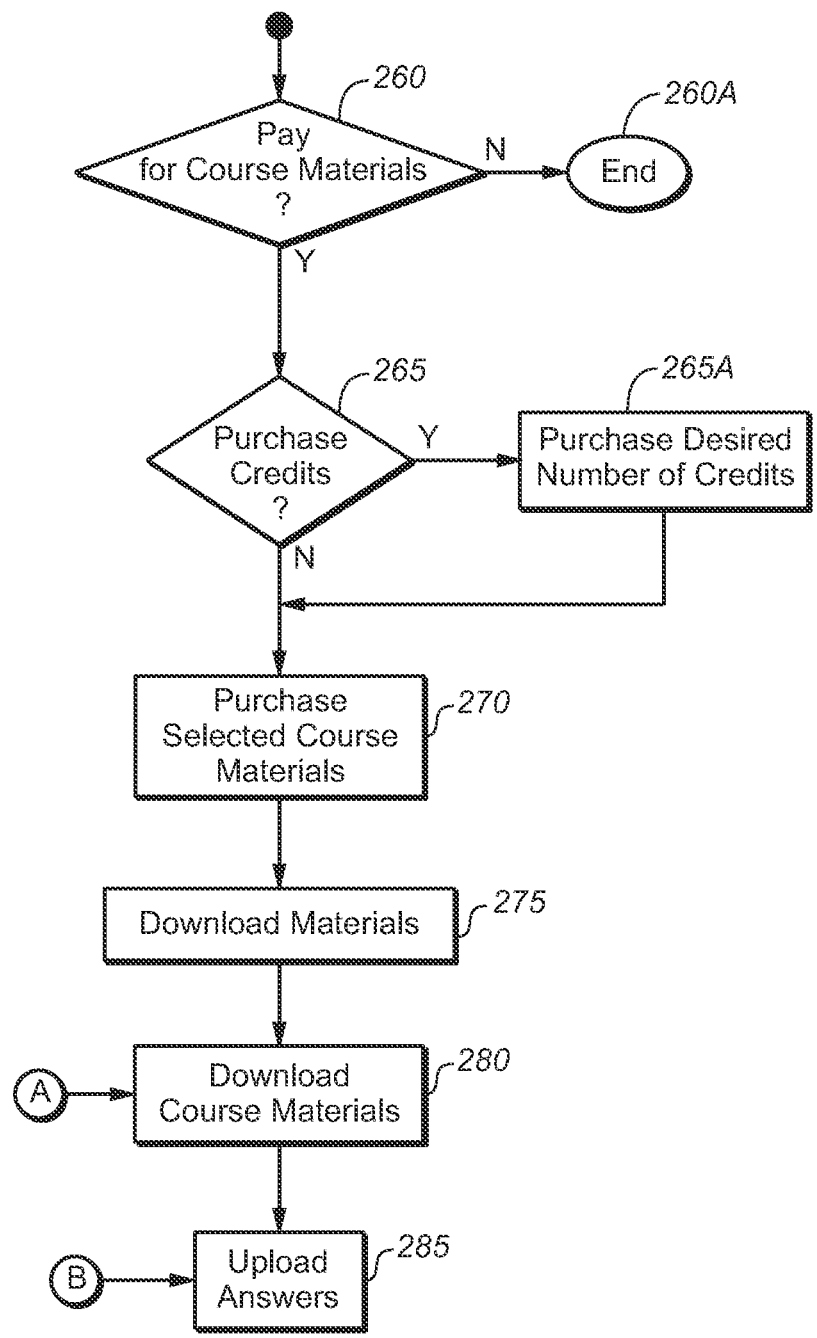

As shown in FIGS. 2A and 2B, in another aspect of the invention the student procures rights to the custom compilation by initially accessing the home page at 210. The student then registers or logs in, at 220. If at 220A it is the first instance of encountering the electronic storefront, the student establishes a new account at 220B, generally by entering credit card information, or by providing access to a school administered financial account so that it may be drawn on directly. In any case, the institution the student attends is generally specified. Next, the student logs in at 220C and is directed to a student home page, at 230. Then at 240 the student chooses a class from those available at the student's institution in step 240A, or alternatively, finds a class at another institution, in step 240B. When finding a class under step 240B, the student specifies a school or institution through some combination of a unique ID, location (e.g., country, state, city), and the institution's name, and identifies the actual course by specifying a catalog, schedule or course number at 240C. At 240D the student may elect to choose a laboratory or other ancillary educational experience associated with the class. Thus, at 240E, the student may select the time, date and day of the week when the lab or other experience will be conducted. Otherwise, the student proceeds to view course materials at 250.

In one embodiment of the invention, the student views a custom compilation and related educational course materials, at 250. At 260 the student may elect to purchase rights to course materials or end the session at 260A. Methods of payment contemplated include charging to a student financial account held with an educational institution, physical delivery of a check or cash, wire transfer, payment by credit or debit card, and cash on delivery of computer readable medium. According to one embodiment of the invention, a student is presented with the option at 265 of purchasing a number of "credits," as at 265A, each having a predetermined monetary value. The credits can be banked in an account and drawn against for purchase of rights to each segment. The student may add "credits" to the account as desired or as dictated by available funds. Once the desired access rights to the entire set of assigned materials has been purchased at 270, the student may access them collectively or individually as may be convenient at 275. Methods of download contemplated include delivery of text as an email attachment, contemporaneous download, and mailing of a form of computer readable medium. If the course materials have previously been purchased, the student may proceed directly from class selection at 240A to downloading course materials at 280 and uploading answers at 285.

In step 260, the student may have access to some free materials such as those provided directly by the instructor to the extent that they supplement the lecture schedule. Free materials may include a reading list of educational materials, a class schedule, lecture notes, and assignments. The student is also provided the ability to preview all materials available for purchase. Preferably, the student may select between one or more alternative texts, compilations, supplemental texts, or answers for validating study questions, or choose other forms of electronic course materials. The free materials are available in addition to the purchased materials. In addition, after purchasing the custom compilation as discussed above, the student is allowed to upload answers to experiments, at 285.

An important aspect of the invention facilitates the prevention of copyright violations. As discussed above, a student must procure the custom compilation by legitimate means, that is by purchasing rights to the materials, rather than by text sharing or by making use of a version left over from a previous class. The legitimate procurement is recorded in the student roster, thereby making a record of a valid sale of the copyright protected materials.

Although the sharing of textbooks as well as the purchase and reuse of used material is largely discouraged by the processes of the invention, all students benefit greatly from the opportunity to purchase custom compilations and related educational works in electronic format according to the invention. These include expected lower costs because educational materials not needed for a particular class will not be included in custom compilations. Furthermore, the custom compilations and related materials will be more portable, as they can be stored on portable memory devices such as a portable computer, CD, DVD, memory chip, or portable USB device. Text materials and lecture notes created according to the invention will be better organized and chronologically integrated with the actual sequence of coverage of materials in a classroom. Students using the course materials delivered as electronic media, e.g., the instructor's outline, class presentation, or textual instructional materials, will be able to annotate them freely with their own personal notes. It is anticipated that authors will receive feedback from instructors and students who make use of the author's works, and that the authors will continuously update their course materials in response. Students will benefit greatly from the improved accuracy of the instructional materials resulting from this interactive process.

The invention greatly enhances opportunities for distance learning, since a custom compilation may combine videos of past lectures, class discussions, questions and answers, review sessions, and laboratory experiments.

Traditionally, an extensive network of sales representatives has been needed to promote educational works, which has discouraged publishers from considering submissions from authors who are less well known than academicians associated with the most prestigious universities and colleges. A major advantage to the invention is that authors of educational works associated with less prestigious institutions or smaller publishing houses will benefit from their works receiving greater exposure to the market for such materials, with correspondingly increased sales potential.

Figure 3:
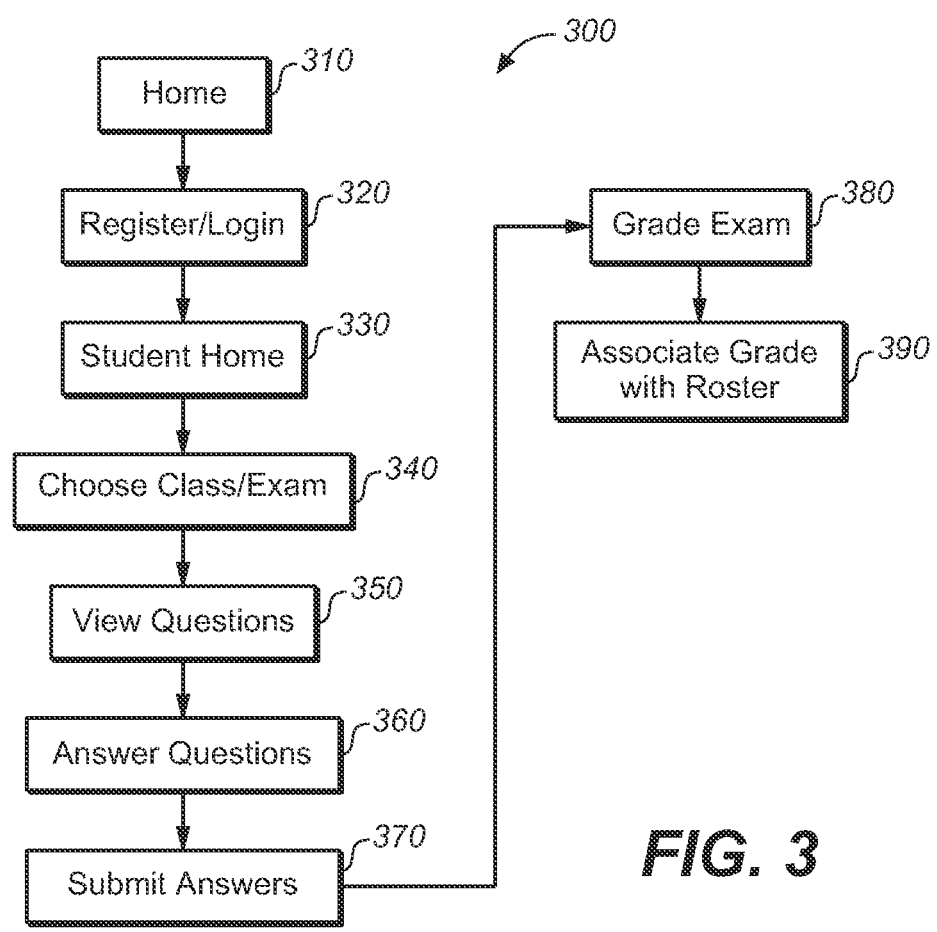
FIG. 3 shows a flow chart illustrating the interactive steps of testing and grading students.

In another aspect of the invention, the instructor may test and grade students over a communications network using the roster, as illustrated in FIG. 3. The student initiates the examinations or quiz process by accessing the home page, at 310, then logging in with a student identification number and a key or code, at 320. The student is then directed to a student home page, at 330, from which the student selects the appropriate class and exam to be taken, at 340. It should be noted that in a preferred embodiment of the invention, the instructor not only creates the examination, but also specifies a time window within which the student will have electronic access to it for viewing questions, as shown in step 350. During the specified time window, the questions can be viewed in any order determined by the student. Thus, the questions may be viewed and answered one at a time, all at once, or in any other sequence, so that the student can answer all or a selected portion of the questions as deemed most efficient, at step 360. Finally, either during the progress of the exam or at its completion, the student submits the answers for grading, at 370. The host computer then receives the answers, correlates the correct answers to the answers provided, and tabulates a grade for each particular student, at 380. As discussed above, only those students who have acquired a login or entry key associated with the course materials for the class are qualified to access the exam and submit answers. Consequently, only those qualified students will be able to have the exam graded, at 380. Finally, the server enters or associates a grade with a particular student on the roster, at 390.

For security reasons it may be preferable for all or a selected portion of the steps in the grading process to be performed on a computer network separate from that operated by the content source maintaining party, including a virtual private network. Similarly, it may be advisable to permit the instructor to perform some or any portion of the scoring and grading of the examination manually, and then update the roster by associating grades with students on a separate non-networked computer. Alternatively, raw answers may be transmitted to the instructor, who then scores the answers and enters a grade in a separate roster not accessible on the host network. In another embodiment, a key code or password may be required to access the roster to associate the grades with each student, per step 390. In any of the above scenarios, the roster may be organized for grading against an objective standard or according to where the answer falls within a fixed distribution.

The method of testing and grading also contemplates each student providing answers on a tangible or fixed electronic medium, which is then scored either manually or by electronic data processing. The methods of electronic data processing of examinations, exercises or assignments also include machine or computer grading of text answers, that is, by looking for a combination of key words, numeric answers, or semantic content.

The various schemes for electronic data processing of examinations and association of grades using the roster saves times for the instructor, and reduces management overhead for the institution. Thus, the instructor is likely to use the electronic roster according to the invention rather than a traditional one. When the instructor deploys the electronic roster, only students that have both registered for the class and acquired sufficient access rights to a custom compilation are eligible to be graded, thereby discouraging the use of non-authorized course materials.

Benefits to publishers using the inventive method include a reduction in distribution cost, and avoidance of revenue loss from copyright infringement and used book sales.

Figure 4:
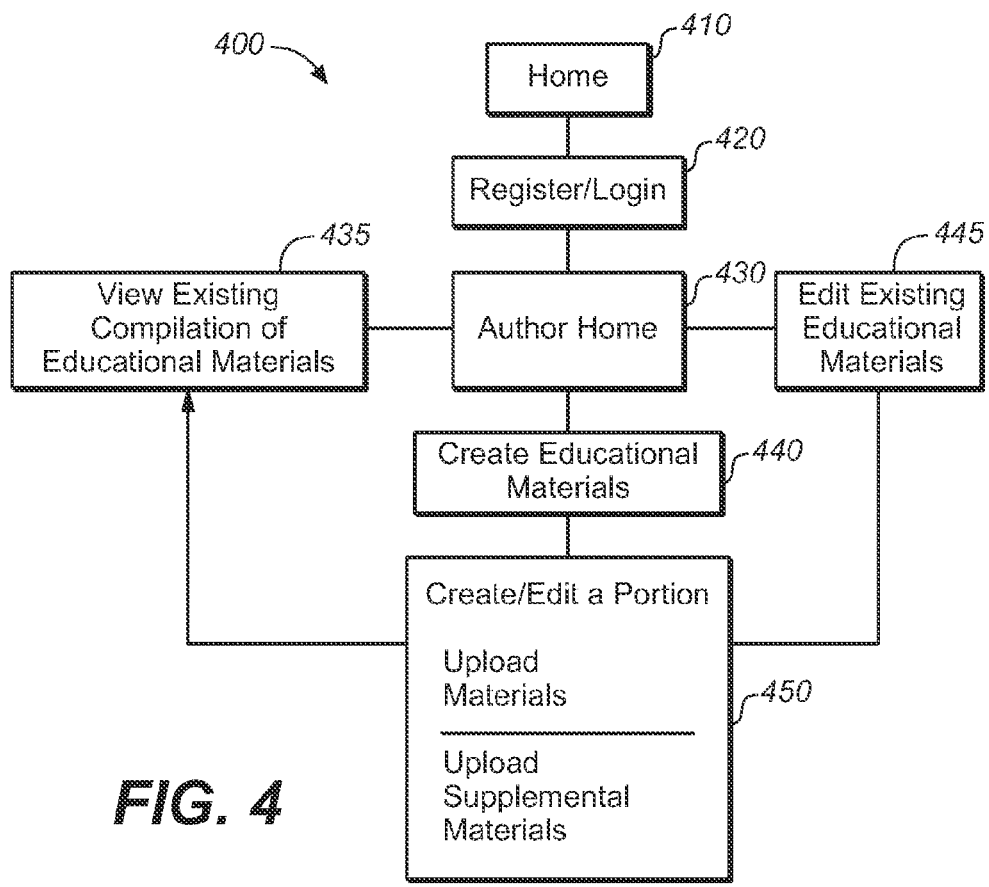
FIG. 4 shows a flow chart illustrating the interactive steps taken by an author when creating and editing instructional materials.

Referring now to FIG. 4, in another aspect of the invention an author may submit or update and revise content, as generally indicated at 400. An author initiates the creation, submission or revision process by accessing the home page, at 410. The author then either registers or logs in with an identification number, key, or code obtained during a prior registration, at 420. The author is then directed to an author home page, at 430, from which the author chooses to view an existing compilation of educational materials, at 435, create new educational materials, at 440, or edit existing educational materials, at 445. It is within the contemplation of the invention that existing materials may have been created by the author or that the author has rights over the materials, such as the right to revise the materials. At step 450 the author selects a portion of the materials for revision or uploads new or revised materials to replace existing materials. The author also has the option of reading or reviewing text in the same format it would be delivered to a student purchasing the materials. Alternatively, the author can upload alternative and supplemental materials, such as experiments, web links to additional resources, photographs, and video and sound files to add, supplement or modify the interactive content of the text.

The ability of the author to make corrections at anytime allows for continuous correction and updating of the text as an author receives feedback from students or colleagues who are using segments of the materials at educational institutions. The system also optionally provides for the delivery of email alerts or automatic updates to students who have acquired segments of the materials and to instructors who have selected segments of the work, so that they can take immediate advantage of any corrections or supplements to the materials. Alternatively, an author can make proposed revisions and then distribute the proposed revisions to a limited audience, such as the publisher, an editing committee, or peer reviewers, for comment before the final revisions are accepted and distributed to all users. It should be noted that the faster rate of correction motivated by the invention and the inclusion of the instructor's own materials discourages the use of outdated educational materials.

Figure 5:
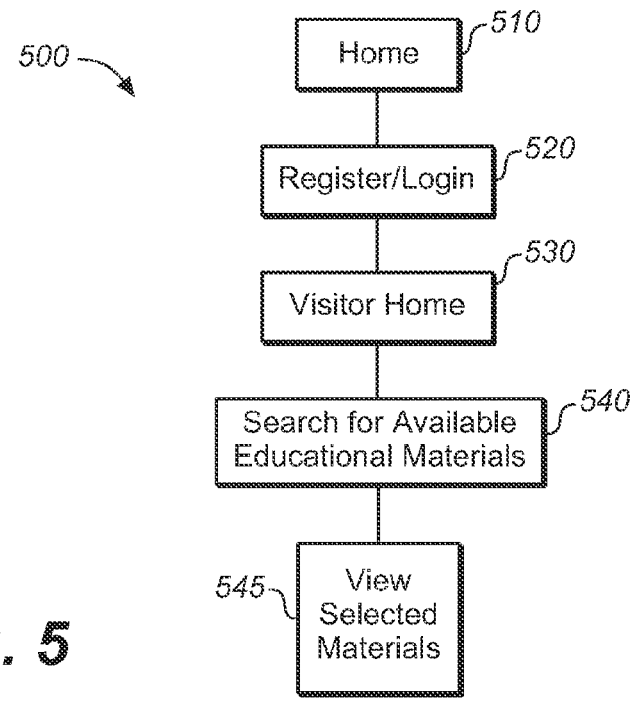
FIG. 5 shows a flow chart illustrating the interactive steps taken by a visitor when previewing educational materials.

In another aspect of the invention, illustrated in FIG. 5, a method by which a visitor can preview electronic content, e.g., custom compilations, is generally indicated at 500. The visitor initiates the preview process by accessing the home page, at 510. The visitor then either registers or logs in with an identification number, key or code obtained during a prior registration, at 520. In one embodiment of the invention, the identification number, key, or code may be one obtained during a previous session on the system. The visitor is then directed to a visitor home page, at 530, from which the visitor is able to search for and identify existing educational materials, custom compilations, and other electronic content available for purchase by students, at 540. In one embodiment, a visitor has the same or a limited form of searching capability for existing electronic content as discussed above for an instructor. Similarly, the visitor may have the same or a limited form of searching capability for custom compilations as described above for students. Upon selection of a custom compilation, or other electronic content, the visitor is able to view all or selected portions of the materials, such as abstracts of experiments, or other portions of the custom compilation, at 545. Since it is anticipated that visitors will not have purchased any segments of the educational materials, the portions of the educational materials available for viewing by visitors will be determined at the discretion of the publisher or service provider. The overarching objective of permitting authored materials to be viewed by visitors is to allow a member of the general public to preview a sufficient amount of the materials to make an informed decision as to whether or not to purchase the book, compilation, or other electronic content, or to take the class or instructional program corresponding to the educational materials being viewed. As the content cannot generally be freely misappropriated, the visitor is encouraged to purchase rights to the materials or compilation in the manner discussed above for students.

It should be appreciated that the preview of custom compilations is an alternative to the content of an educational institution's printed course catalog since custom compilations may include a synopsis of a course, as well as a more in depth course preview, thereby enabling students to better select courses that meet their needs or interests.

The novel method of publishing and distributing instructional materials via the Internet, and its functional equivalents, specifically includes, in addition to the above mentioned criteria, those facts, data or commentary abstracts, excerpts, or matter similar in kind, in the disciplines or sub-disciplines of Science, Math, Technology, Social Science, Art, Humanities and General Education or any other discipline which lends itself to be sold and marketed using the Internet. Notwithstanding the above, specifically included in the novel method of publishing and distributing instructional materials is any transmitting, distributing, transferring, disseminating or any receiving of any of the above described segmented instructional materials, or any matter similar in kind, by any individual, business entity, trust or other legally recognized entity for the purpose of conducting E-commerce.

While preferred embodiments of novel method of publication and distribution of educational materials have been described above, it is not intended to limit the scope of the invention to the particular forms set forth, but on the contrary, it is intended to cover such alternatives, modifications, and equivalents as may be within the spirit and scope of the invention as defined by the following claims.

We claim:

1. A system for publication and distribution of educational materials, the system comprising:
   at least one host computer capable of
   receiving over a communications network one or more educational works, at least one of the one or more educational works having a plurality of segments,
   storing the educational works,
   receiving over a communications network one or more selections of at least one of the plurality of segments,
   retrieving the selected segments from the one or more educational works,
   generating a compilation of educational course materials containing at least the selected segments,
   associating one or more identifiers with the compilation,
   receiving a request for access rights to a selection of one or more segments of the identified compilation, and
   providing access rights to the selected segments in response to the request.

2. The system for publication and distribution of educational materials of claim 1 wherein:
   the one or more educational works are received from at least one author thereof.

3. The system for publication and distribution of educational materials of claim 1 wherein:
   the at least one host computer is further capable of recording payment for the access rights requested.

4. The system for publication and distribution of educational materials of claim 3 wherein:
   the access rights are provided only if the payment has been recorded.

5. The system for publication and distribution of educational materials of claim 1 wherein:
   each of the plurality of segments has one or more identified authors, and
   the at least one host computer is further capable of paying a royalty to the one or more authors for the access rights provided.

6. The system for publication and distribution of educational materials of claim 1 wherein:
   the access rights provided are limited to viewing the selected segments.

7. The system for publication and distribution of educational materials of claim 6 wherein:
   the access rights are provided without requiring compensation therefor.

8. The system for publication and distribution of educational materials of claim 6 wherein:
   the access rights are provided in exchange for compensation.

9. The system for publication and distribution of educational materials of claim 1 wherein:
   the access rights provided are time limited.

10. The system for publication and distribution of educational materials of claim 1 wherein:
    a requestor status is associated with the request, and
    the access rights provided are limited according to the requestor status.

11. The system for publication and distribution of educational materials of claim 1 wherein:
    the access rights provided allow copying of the selected segments.

12. The system for publication and distribution of educational materials of claim 11 wherein:
    the access rights are provided without requiring compensation therefor.

13. The system for publication and distribution of educational materials of claim 11 wherein:
    the access rights are provided in exchange for compensation.

14. A system for publication and distribution of educational materials, the system comprising:
    at least one host computer capable of
    receiving over a communications network one or more educational works from at least one author of the educational works, at least one of the one or more educational works having a plurality of segments, each of the plurality of segments having one or more identified authors,
    storing the educational works,
    receiving over a communications network one or more selections of at least one of the plurality of segments,
    retrieving the selected segments from the one or more educational works,
    generating a compilation of educational course materials containing at least the selected segments,
    associating one or more identifiers with the compilation,
    receiving a request for access rights to a selection of one or more segments of the identified compilation,
    recording payment for the requested access rights,
    providing access rights to the selected segments in response to the request if the payment has been recorded, and
    paying a royalty to the one or more authors for the access rights provided.

15. A method for publication and distribution of educational materials, the method comprising:
    receiving over a communications network one or more educational works, at least one of the one or more educational works having a plurality of segments,
    storing the educational works,
    receiving over a communications network one or more selections of at least one of the plurality of segments,
    retrieving the selected segments from the one or more educational works,
    generating a compilation of educational course materials containing at least the selected segments,
    associating one or more identifiers with the compilation,
    receiving a request for access rights to a selection of one or more segments of the identified compilation, and
    providing access rights to the selected segments in response to the request.

16. A method for publication and distribution of educational materials, the method comprising:
    receiving over a communications network one or more educational works from at least one author of the educational works, at least one of the one or more educational works having a plurality of segments, each of the plurality of segments having one or more identified authors,
    storing the educational works,
    receiving over a communications network one or more selections of at least one of the plurality of segments,
    retrieving the selected segments from the one or more educational works,
    generating a compilation of educational course materials containing at least the selected segments,
    associating one or more identifiers with the compilation,
    receiving a request for access rights to a selection of one or more segments of the identified compilation,
    recording payment for the requested access rights,
    providing access rights to the selected segments in response to the request if the payment has been recorded, and
    paying a royalty to the one or more authors for the access rights provided.

17. The system for publication and distribution of educational materials of claim 1 wherein:
    one of said one or more identifiers is associated with an educational institution.

18. The system for publication and distribution of educational materials of claim 1 wherein:
    one of said one or more identifiers is associated with an educational course.

* * * * *